United States Patent
Spies et al.

(10) Patent No.: US 6,759,122 B2
(45) Date of Patent: Jul. 6, 2004

(54) ADHESIVE TAPES

(75) Inventors: Manfred Spies, Bad Bramstedt (DE); Zygmunt Kozaczka, Hamburg (DE)

(73) Assignee: tesa AG, Hamburg (DE)

( * ) Notice: Subject to any disclaimer, the term of this patent is extended or adjusted under 35 U.S.C. 154(b) by 170 days.

(21) Appl. No.: 10/043,059

(22) Filed: Jan. 8, 2002

(65) Prior Publication Data
US 2002/0132112 A1 Sep. 19, 2002

(30) Foreign Application Priority Data
Jan. 13, 2001 (DE) ......................................... 101 01 333

(51) Int. Cl.$^7$ .................................................. C09J 7/02
(52) U.S. Cl. ............................... 428/355 AC; 428/343; 428/356; 442/149; 442/151
(58) Field of Search .................. 428/355 AC, 356, 428/343; 442/149, 151

(56) References Cited

U.S. PATENT DOCUMENTS

| | | | |
|---|---|---|---|
| 3,743,616 A | | 7/1973 | Kest |
| 3,937,683 A | | 2/1976 | Ferrar |
| 4,189,419 A | * | 2/1980 | Takemoto et al. ... 260/29.7 NR |
| 4,438,232 A | * | 3/1984 | Lee ............................. 524/272 |
| 4,968,740 A | * | 11/1990 | Makati et al. ............... 524/501 |
| 6,511,745 B2 | * | 1/2003 | Spies ................... 428/355 AC |
| 2002/0132112 A1 | * | 9/2002 | Spies et al. ................. 428/343 |

FOREIGN PATENT DOCUMENTS

| | | | |
|---|---|---|---|
| EP | 0688843 A1 | * | 12/1995 |
| EP | 1103587 A2 | * | 5/2001 |

OTHER PUBLICATIONS

EP 1103587 A2 Pat Abst, May 2001.*
Derwent Abstract of JP 03045676, published Feb. 27, 1991.

* cited by examiner

*Primary Examiner*—Daniel Zirker
(74) *Attorney, Agent, or Firm*—Norris McLaughlin & Marcus

(57) ABSTRACT

An adhesive tape having a backing and an adhesive composition, wherein the adhesive composition is a butadiene-acrylate dispersion having a butadiene content of more than 55% in a blend with natural rubber latex and has been coated onto the backing and then dried.

14 Claims, No Drawings

ADHESIVE TAPES

The invention relates to the development of pressure sensitive adhesive tapes comprising cohesive composition systems based on butadiene-acrylate latices of high butadiene content and natural rubber latex.

BACKGROUND OF THE INVENTION

The conventional adhesive compositions systems for pressure sensitive adhesive tapes are based substantially on natural rubber, styrene block copolymers, and polyacrylates. For applications where reversible behavior is a specific requirement, ethylene-vinyl acetates or polyisobutylenes are also appropriate.

Styrene-butadiene latices have been used for many years in the pressure sensitive adhesives (PSA) field for impregnating and stabilizing backing materials. Papers, wovens, and nonwovens are in the foreground in this case. Because of the application, the impregnation or coating, must absolutely not be tacky. The styrene-butadiene copolymers used for this application are therefore required to contain a relatively high fraction of hardening monomers while including sufficient softening monomer that the copolymer overall is still elastic. Styrene-butadiene latices having a butadiene content of about 25–55% comply very well with this requirement. Films of these copolymers, depending on the butadiene content, are moderately elastic to elastic, and are nontacky. Such copolymers have been available on the base materials market for many years (Butofan® grades from BASF, and various grades from Dow and Synthomer). Because of their preparation, such latices and dispersions include emulsifier systems to produce compatibility between the organic phase and the aqueous phase.

In the past, styrene-butadiene copolymers have also been used as base polymers for label compositions. In the labels sector, cohesion is often a secondary importance, so that the properties of weakly adhering systems are in many cases adequate after they have been compounded with customary tackifiers (resin dispersions).

Styrene-butadiene copolymers have also been used in combination with natural rubber latices. An overview of this can be found in Donatas Satas, Handbook of Pressure Sensitive Adhesive Technology, 3rd Edition, *Natural Rubber Adhesives* by G. L. Butter (P. 276–283).

Osari in EP 95108577 describes the use of aqueous emulsions based on natural rubber latex for producing pressure sensitive adhesive tapes. The addition of styrene-butadiene dispersions having a customary butadiene content (in the range of about 25–55%) serves here primarily to stabilize the shear-unstable natural rubber latex and to set the viscosity.

The suitability of customary styrene-butadiene copolymers with a butadiene content of between 25 and 55% as framework polymers for cohesive PSA compositions is poor, since they always have to be made tacky using tackifier resins, in amounts which are considerable in some cases, and this is associated with a far-reaching loss of cohesion. This prevents their use for adhesive tapes, for which cohesive adhesive compositions are needed.

Owing to their polymer structure and pricing level, butadiene copolymers with a high butadiene content, containing a hard and thus cohesive segment, are of fundamental interest as framework polymers for cohesive PSA compositions.

It was an object of the invention to provide further butadiene copolymers for the application described which do not have the drawback of low cohesion and which can be used to make a pressure sensitive adhesive tape very suitable, inter alia, for reversible applications.

SUMMARY OF THE INVENTION

This object has been achieved by the use of a butadiene-acrylate dispersion of high butadiene content which has compounded with natural rubber latex. This prevents adverse effects on the cohesion of the adhesive compositions caused by tackifier resins. Residues caused by tackifier resins, as well, are therefore prevented during the detachment.

The adhesive compositions of the present invention may be used without tackifier resin.

The group of the butadiene-acrylate copolymers comprises framework polymers of butadiene and a moderately hard comonomer such as butyl acrylate, for example. Butadiene-acrylate copolymers have much lower glass transition points than butadiene-styrene or butadiene-methyl methacrylate copolymers. At a butadiene content of about 75% the glass transition point may be lowered by about 15° C. to −70° C. by converting from styrene to, say, butyl acrylate as comonomer.

The resulting compound may be admixed, if desired, with further coagents, such as aging inhibitors, UV stabilizers, fillers or emulsifiers, for example, in order to tailor further the protection against aging and the adhesion data to the application.

After the adhesive composition has been coated onto a polymer or paper backing, a pressure sensitive adhesive tape is obtainable which meets the requirements for an adhesive tape having cohesive properties and which is suitable, for example, for reversible applications. Products of this kind may be employed in the field of surface protection.

Adhesive Compositions:

The copolymerization of butadiene with acrylates such as butyl acrylate, for example, in an aqueous medium gives copolymers which are film forming and which have a Tg which is suitable for pressure sensitive adhesive bonding. Butadiene-acrylate dispersions are generally stabilized by incorporating small amounts of carboxyl groups, which at the same time improves the adhesion to many substrates.

As adhesive compositions for the invention it is possible in particular to use carboxylated butadiene-acrylate copolymer dispersions having a butadiene fraction of 55–95%, preferably 60–85%, based on the total solids fraction of acrylate and butadiene, which in a mixture with natural rubber latex exhibit outstanding suitability as adhesive compositions for reversible adhesive tapes. Carboxylated copolymers of this kind contain in particular less than 10%, preferably less than 5%, based on the monomer content, of carboxyl comonomer, especially acrylic acid, in the copolymer.

Butadiene-acrylate dispersion grades in accordance with the invention, having a butadiene content >60%, are available, for example, from Dow.

As the natural rubber latex component, both low ammonia latices and high ammonia latices are suitable. Latices of the low ammonia type are preferred.

Based on the total solids content of butadiene-acrylate copolymer and natural rubber latex, the natural rubber fraction should be in the range 5–80%, preferably 20–50%. For tailoring the adhesive properties it is also possible to use mixtures of different natural rubber latices. In order to improve the aging behavior it is possible to add dispersions of customary aging inhibitors and UV stabilizers, which are well known from the field of elastomers.

It is also possible, where necessary, to add further additives for adapting the properties of the product, such as, for example, fillers or emulsifiers of the alkoxylated alkylphenol type, for example. These additives make it possible to exert further, desired influence over the adhesive properties.

Where necessary, the adhesion/cohesion balance may be set by chemical crosslinking via the carboxyl groups present, by means of added crosslinking agents such as aluminum chelate or titanium chelate, for example. In contrast to many styrene block copolymers, radiation crosslinking is likewise possible owing to the sufficiently high molecular weight.

The adhesive composition application rate is 10–120 g/m², preferably 15–40 g/m².

Backing Materials:

All customary backing materials are suitable for the invention. They substantially include films and papers whose properties and whose production and/or aftertreatment process gives them the required mechanical application properties.

In the case of the films, suitable materials substantially include polyethylene, polypropylene, polyvinyl chloride, polyesters, and other polymers and copolymers customary for the application, which may be used in single-layer or multilayer form. In multilayer systems, the composition and the thickness of the individual layers may also vary.

Both blown film and flat film may be used.

The thicknesses of the films are between 10 and 250 μm, preferably between 20 and 120 μm.

In order to ensure sufficient adhesion of the adhesive composition on the backing material, the surface energy on the side that is to be coated must be situated within a defined range. This may be ensured either by additional coating with a primer or by a surface treatment. Preference is given to a corona or flame pretreatment by means of which the desired surface energies may be achieved. The surface energies should be in a range of 25–50 mN/m, preferably 30–45 mN/m.

Further suitable backing materials include impregnated and highly sized papers with defined creping, having tensile strengths which satisfy the desired requirements. Depending on the desired application, it is possible to use both papers with greater machine direction stretchability than cross direction stretchability and papers with greater cross direction stretchability than machine direction stretchability, in both bleached and environment-friendly unbleached versions.

All percentages are by weight.

EXAMPLE

Example 1

A dispersion adhesive composition composed of 50% of a carboxylated butadiene-acrylate dispersion having a butadiene content of approximately 70% (XZ 92027.00, butadiene-acrylate dispersion from Dow) and 50% of natural rubber latex (low ammonia centrifuge latex) is coated continuously with a layer thickness of 25 g/m² onto a polyester film, using a wire doctor. The percentages are based on the solids content.

Technical Conditions:

| Machine: | pilot coating plant |
|---|---|
| Applicator: | wire doctor |
| Backing web speed: | 3.5 m/min |

The coated material is subsequently dried thermally:

| Drying (suspension nozzle drier): | zone 1: 100° C. |
|---|---|
| | zone 2: 120° C. |

The bale material is then cut into rolls.

Technical Data (Fresh State):

Bond strength/steel: 0.2 N/cm

Shear stability/steel (13×20 mm, 1 kp): >20 000 min:

Microshear path (40° C., 3N ) 10 μm

Thermoshear path (5° C./min, 3N, in ° C.): >200° C.

We claim:

1. An adhesive tape having a backing and a cohesive adhesive composition, wherein the cohesive adhesive composition is a butadiene-acrylate dispersion having a butadiene content of more than 55% in a blend with natural rubber latex and has been coated onto the backing and then dried.

2. The adhesive tape as claimed in claim 1, wherein the natural rubber latex is either of the low ammonia or of the high ammonia type.

3. The tape as claimed in claim 1, wherein said butadiene-acrylate is a mixture of butadiene-acrylates and said natural rubber latex is a mixture of natural rubber latexes.

4. The adhesive tape as claimed in claim 1, wherein the adhesive composition is chemically crosslinked.

5. The adhesive tape as claimed in claim 1, wherein the adhesive composition is crosslinked by electron beam crosslinking (EBC).

6. The adhesive tape as claimed in claim 1, wherein its aging stability is improved by the addition of aging inhibitors and UV stabilizers.

7. The adhesive tape as claimed in claim 1, wherein the backing is comprised of a material selected from the group consisting of polyolefins, polyesters, PVC and paper.

8. The adhesive tape as claimed in claim 1, wherein the application rate of the adhesive composition is 10–120 g/m².

9. The adhesive tape as claimed in claim 1, wherein to improve the anchoring of the composition the surface of the backing is treated by corona or flame Pretreatment or is coated with a primer.

10. The adhesive tape as claimed in claim 1, wherein the butadiene-acrylate dispersion is a carboxylated butadiene-acrylate dispersion.

11. The adhesive tape as claimed in claim 1, wherein the fraction of natural rubber latex is in the range 5–80%, based on the total solids content of butadiene-acrylate copolymer and natural rubber latex.

12. The adhesive tape of claim 4, wherein said adhesive composition is chemically crosslinked with a crosslinker selected from the group consisting of aluminum chelate, titanium chelate, isocyanates and epoxys.

13. The adhesive tape of claim 11, wherein said range is 20–50%.

14. The adhesive tape of claim 1, wherein said adhesive composition is free of tackifier resin.

* * * * *

UNITED STATES PATENT AND TRADEMARK OFFICE
CERTIFICATE OF CORRECTION

PATENT NO. : 6,759,122 B2
DATED : July 6, 2004
INVENTOR(S) : Spies et al.

It is certified that error appears in the above-identified patent and that said Letters Patent is hereby corrected as shown below:

<u>Column 4,</u>
Line 41, "flame Pretreatment" should read -- flame pretreatment --

Signed and Sealed this

Fifth Day of April, 2005

JON W. DUDAS
*Director of the United States Patent and Trademark Office*